April 5, 1949.  L. E. THOMPSON  2,466,133
ELECTRIC MOTOR CONTROL
Filed March 31, 1947
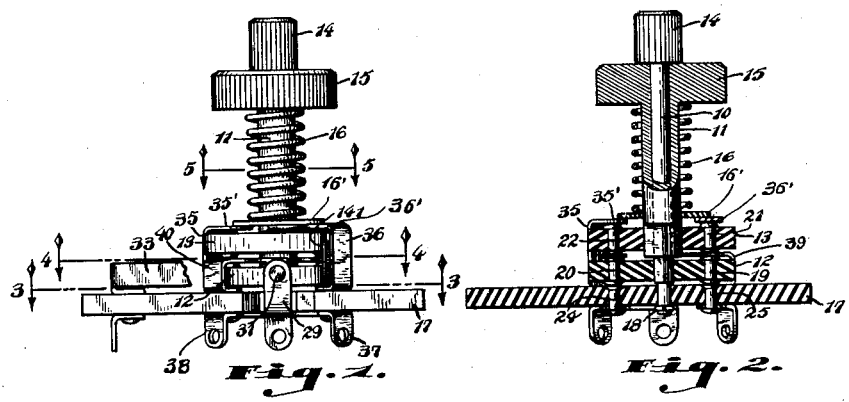
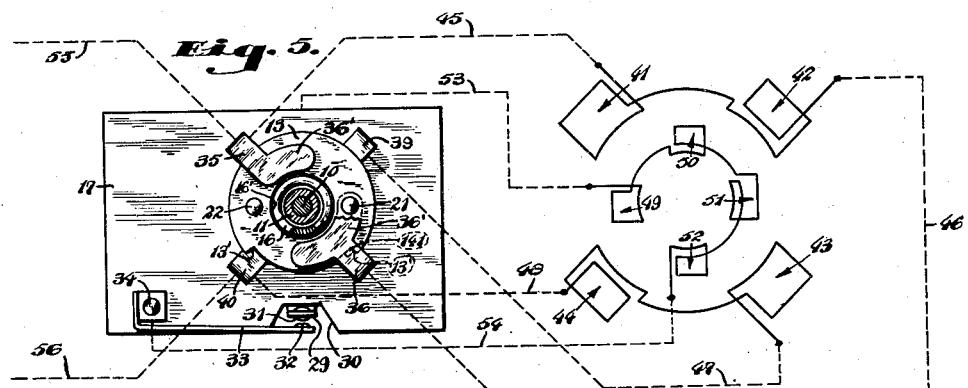
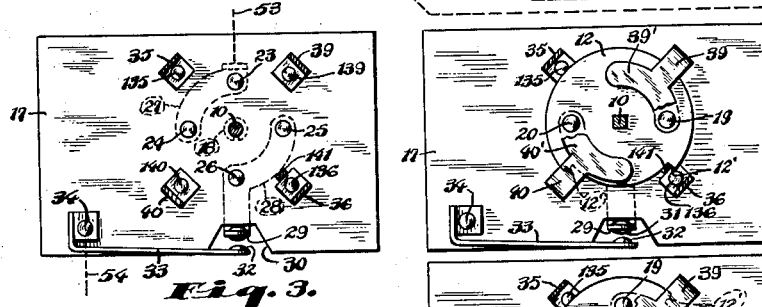
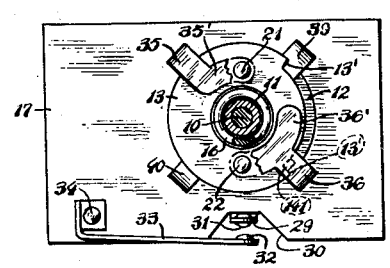
INVENTOR.
LAWRENCE E. THOMPSON,
BY: Harold B. Hood.
ATTORNEY.

Patented Apr. 5, 1949

2,466,133

UNITED STATES PATENT OFFICE 2,466,133

ELECTRIC MOTOR CONTROL

Lawrence E. Thompson, Marion, Ind.

Application March 31, 1947, Serial No. 738,394

3 Claims. (Cl. 200—6)

The object of the present invention is to provide for a combination reversible electric motor and switch, said switch being adaptable to select either of two motor energizing voltages and to reverse the direction of rotation of said motor.

The primary object of the present invention is to provide for a manually manipulable rotary switch having two independently operable switching sections, one of which is adapted to select either of two motor energizing potentials and the other adapted to change the direction of rotation of said motor by reversing the polarity of the voltage impressed on the starting winding of said motor.

A further object is to provide a rotary electric switch capable of being operated to vary the circuit constants of a single branch of a two circuit system without disturbing the constants of the other branch and vice versa.

The common expedient, well known to the art, to accomplish the above mentioned objects is a control box which is used in association with a reversible electric motor. This control box comprises, essentially, a number of bus bars so interchangeably arranged that the proper manual adjustment of them will effect the desired circuit changes. The said bars are usually held in place by means of set screws and are provided with end slots to facilitate their being clamped in the proper positions. Obviously, this switching means is clumsy and cumbersome necessitating much time and effort to effect the desired changes, and furthermore, the commonly available sources of electric power are of sufficient magnitude to cause serious injury or death to any person coming into contact therewith; and since the bus bars are exposed and must be handled by the operator, a very desirable feature of danger presents itself, unless the motor is preliminarily disconnected from the power supply which is unnecessary with my switch.

My invention obviates the manual handling of the bus bars to effect desired circuit changes thereby overcoming the above-mentioned undesirable and dangerous features of the old switching system. By merely turning a knob, a 110 or 220 volt source of voltage may be applied to the electric motor as desired, and by merely turning another knob on the same switch the direction of rotation of said motor may be changed.

To the accomplishment of the above and related objects, my invention may be embodied in the form illustrated in the accompanying drawings, attention being called to the fact, however, that the drawings are illustrative only, and that change may be made in the specific constructions illustrated and described, so long as the scope of the appended claims is not violated.

Fig. 1 of the drawings is a side elevation of the illustrated embodiment of my invention;

Fig. 2 is a longitudinal cross-sectional view thereof;

Fig. 3 is a sectional view taken on the line 3—3 of Fig. 1 looking in the direction of the arrows;

Fig. 4 is a sectional view taken on line 4—4 of Fig. 1 looking in the direction of the arrows;

Fig. 5 is a sectional view taken on line 5—5 of Fig. 1, with the pressure washer removed, in association with a reversible electric motor which is illustrated by a schematic diagram;

Fig. 6 is a section taken on line 4—4 with the parts in a different position of adjustment; and Fig. 1 is a section similar to that of Fig. 5, with the parts in a different position of adjustment.

Referring more particularly to the drawings, it will be seen in Figs. 1 and 2 that axially secured to concentric shafts 10 and 11 are two rotatable discs or wafers 12 and 13; disc 12 being suitably secured to shaft 10 and disc 13 being suitably secured to shaft 11. Knobs 14 and 15 are preferably formed integral with the opposite ends of these shafts, respectively, with knob 15 preferably the larger of the two.

The preferred method of securing the discs to their respective shafts is more clearly illustrated in Fig. 2. Shaft 11 is preferably formed with its disc end square in shape and is loosely fitted into a correspondingly shaped hole in disc 13 to align said disc against sidewise movement. The lower end portion of shaft 10 which extends beyond the corresponding end of shaft 11 is preferably formed in two sections, the upper of which being suitably formed to be loosely received in a suitably formed axial perforation in disc 12 and the lower of which being suitably formed to be journalled in the companion perforation in base plate 17 which is constructed of some insulating material. A lock ring member 18 is received on the projection of said last named journalled end to limit the upward axial movement of shaft 10. It is desirable that the whole assembly be firmly sandwiched and held together; and this may ordinarily be accomplished effectively through the medium of the spring contact members later to be described. However, in certain installations, it may be desirable to add a coiled spring 16 sleeved on the shaft assembly and confined between the knob 15 and a fiber washer 16' bearing upon certain of said contact members in the manner clearly illustrated in Fig. 2.

Disks 12 and 13 are constructed of a suitable insulating material such as fiber board and are formed substantially alike except for their center holes as previously described and are each provided with two contact pins 19, 20 and 21, 22 respectively. These pins are tightly fitted into diametrically spaced perforations in said discs so that circles having aligned centers drawn through said pins will be congruent. The contact surfaces of said pins protrude beyond the faces of said discs an amount sufficient to maintain a positive contact with their associated contactor members to be described later. Both discs are further provided with rotational stopping means, preferably by the shoulders 12' and 13' formed by a quarter section of said discs having, respectively, smaller radii than the remaining portion of the discs. Stop member 141 in contiguous relation with the periphery of said sections, is preferably formed integral with contactor member 36.

Base plate 17 is provided with four similar contact pins 23, 24, 25, and 26 disposed 90 degrees apart on a circle coaxial and congruent with the above mentioned circles. Contact pins 23 and 24 are electrically connected together by a bridge 27 suitably fastened to the under side of said base plate. Similarly fastened is a bridge 28 which connects contact pins 25 and 26, said bridge being provided with an upwardly bent ear 29 received in a recess 30 cut in the base plate 17. A contact rivet 31 is suitably secured to the ear 29 and is arranged to engage contact rivet 32 secured to spring contact arm 33 fixed to base plate 17 by any suitable fastening means and preferably by a rivet 34.

Contactor spring members 35 and 36, disposed diametrically opposite each other, best illustrated in Figs. 5 and 7, are suitably formed and secured to base plate 17 by any suitable fastening means such as rivets 135 and 136 and are there provided with solder lugs, such as those indicated by the reference numerals 37 and 38. While these solder lugs are shown in the preferred embodiment of my invention, it is to be pointed out that they may be omitted and that lead wires may be soldered directly to said fastening means. The contactor 35' is formed to conform substantially to a 90 degree arc of a circle having a radius equal to that of the aforementioned circles and is disposed over disc 13 to engage contact pin 22 when disc 13 is rotated to its maximum counterclockwise position. Contactor 35' integral with member 35 is of similar construction except that its arc length is substantially 45 degrees and is disposed over disc 13 to engage pin 21 when disc 13 is rotated to the same rotational position. When disc 13 is rotated to its maximum clockwise position, contact pin 22 does not engage either of said contactors while contact pin 21 does engage contactor 36'.

The contactors 39' and 40' integral with members 39 and 40, respectively, arranged diametrically opposite each other and spaced 90 degrees relative to members 35 and 36, Figs. 4 and 6, are sandwiched between discs 12 and 13, said members being secured to said base plate 17 by any suitable fastening means such as rivets 139 and 140. The construction of said contactors is similar to that of contactor 36', said contactors being in continuous engagement with contact pins 19 and 20, respectively, and with contact pins 21 and 22, respectively.

When disc 12 is rotated to its maximum clockwise position, pins 19 and 20 will register with pins 25 and 24 respectively, and when said disc is rotated to its maximum counterclockwise position, pins 19 and 20 will register, respectively, with pins 23 and 26.

It will be clear that contact spring members 35, 36, 39 and 40 may be so biased as to exert a resilient downward pressure on the discs 12 and 13, thus holding the parts in the desired closely sandwiched relation; and that, in installations in which the spring 16 and washer 16' are used, that spring will supplement the pressure effect of said contact members.

A schematic diagram of a reversible electric motor connected to my switch is illustrated in Fig. 5.

The four field coils of the motor indicated by reference numerals 41, 42, 43, and 44 are connected to the contactor members 35, 36, 39 and 40, respectively, by wires 45, 46, 47 and 48. A motor starter winding comprising the four coils 49, 50, 51 and 52 is wired to bridge 27 by wire 53 and to contact arm 33 by wire 54.

In the motor used in the preferred embodiment of the present invention, the normal field coil energizing voltage is 110 volts. If field coils 41 and 42 are connected in parallel with field coils 43 and 44, the motor will function properly with the normal energizing voltage impressed thereon. This parallel connection may be obtained by turning knob 15 to its extreme counterclockwise position thereby establishing a circuit from line wire 55 through contactor member 35, wire 45, field coils 41, 42, wire 46, contactor member 36, contactor 36', contact pin 22, contactor 40', contactor member 40, to line wire 56. Field coils 43 and 44 are connected to line wires 55 and 56 from contactor member 35, through contactor 35', contact pin 21, contactor 39', contactor member 39, wire 47, coils 43 and 44, wire 48, to contactor 40 and line 56.

By turning knob 15 to its extreme clockwise position, the field coils are all connected in series thus necessitating the use of 220 volts line voltage. Fig. 5 is an illustration of the position of the switch when 220 volt operation is desired, the motor being provided with power as follows: Line wire 55 to contactor 35, wire 45, field coils 41, 42, wire 46, contactor member 36, contactor 36', contact pin 21, contactor 39', contactor member 39, wire 47, field coils 43, 44, wire 48, and thence to contactor 40 and line wire 56.

Since the starting winding voltage polarity determines the direction of rotation of the motor, turning the knob 14 to its opposite positions will effectively change this polarity and the direction of rotation of the motor. Power is fed through line wire 55 to contactor 35, wire 45, field coils 41 and 42, wire 46, contactor member 36, contactor 36', contact pin 21, contactor 39', (Fig. 4) contact pin 19, contact pin 25, bridge 28, closed contacts 31 and 32, contact arm 33, wire 54, starting winding 52, 51, 50, 49, wire 53, contact pin 23, bridge 27, contact pins 24 and 20, contactor 40' and thence to line 56. By turning the knob 14 to its maximum counterclockwise position, contact pins 19 and 20 will be brought out of registry with pins 25 and 24, respectively, and brought into registry with pins 23 and 26, respectively, thereby establishing a circuit from line 55 through contactor 35, wire 45, coils 41, 42, wire 46, contactor member 36, contactor 36', contact pin 21, contactor 39', contact pin 19, contact pin 23, wire 53, starting coils 49, 50, 51, 52, wire 54, contact arm 33, closed contacts 32, 31, bridge 28 contact pins 26 and 20, contactor 40', contactor member 40, and thence to line 56.

The same effective circuit is established even though disc 13 is rotated to its extreme counterclockwise position, a circuit being established from line 55 through contactor member 35, contactor 35', contact pin 21, contactor 39', contact pin 19, contact pin 23, wire 53, starting coils 49, 50, 51, 52, wire 54, contact arm 33, closed contacts 32, 31, bridge 28, contact pins 26 and 20, contactor 40', contactor member 40, and thence to line 56.

Any means well known to the art may be used to actuate the contactor arm 33 to produce the necessary starting torque in the single phase motor utilized in the preferred embodiment of the present invention.

I claim as my invention:

1. A switch of the character described including a series of coaxially disposed contiguous discs of insulating material, a like number of concentrically arranged shafts axially secured to said discs for independent rotation of any of said discs, two contact pins associated with each of said discs, two oppositely disposed spring contactor members arranged over the upper of said discs to register with both of said contact pins mounted in said upper disc when said disc is rotated to one position, and only one of said members to register with one of said last-named contact pins, when said disc is rotated to its other position, a second pair of oppositely disposed spring contactor members sandwiched between adjacent discs each being in continuous engagement with one of said contacts in said upper disc, said last-named members being oppositely registrable with each of said contact pins in the lower of said discs, and a third pair of oppositely disposed contactor members positioned immediately below said lower disc to oppositely register with each of said last-named contactor members.

2. A switch of the character described including two coaxially disposed contiguous discs of insulating material, a like number of concentrically arranged shafts, each being axially secured to one of said discs for independent rotation of either of said discs, two diametrically spaced contact pins for each of said discs, each penetrating its disc near the periphery thereof, a first pair of oppositely disposed contactor members alternatively registrable with each and then only one of said contact pins in the upper of said discs, a second pair of oppositely disposed contactor members sandwiched between said discs being in continuous engagement with said contact pins in said upper disc, said last-named members alternatively registrable with each of said contact pins in the lower of said discs, and a third pair of oppositely disposed contactor members alternatively registrable with each of said contact pins in said lower disc.

3. A switch of the character described including two coaxially disposed contiguous discs of insulating material, a like number of concentrically arranged shafts, each being axially secured to one of said discs for independent rotation of either of said discs, a knob fixedly associated with each of said shafts at a point remote from its disc, a spiral compression spring concentrically associated with said shafts, means associated with said shafts and limiting movement of said discs under the influence of said spring, two diametrically spaced contact pins for each of said discs, each penetrating its disc near the periphery thereof, a first pair of oppositely arranged contactor members, contactors being formed integral therewith disposed over said upper disc, one of said contactors being formed to substantially resemble a quarter section of an annulus, the other of said contactors being formed to substantially resemble an eighth section of the same annulus, both of said contactors being severally registrable with said contact pins for one position of said upper disc while only the first-named contactor of said contactors is registrable with one of said contact pins for the other position of said upper disc, a second pair of oppositely disposed contactor members, contactors formed integral therewith, said second pair of members being spaced 90 degrees from said first pair of members, said last named contactors formed substantially like the first-named contactor being sandwiched between said discs, said last-named contactors being in continuous engagement with said contact pins in said upper disc and alternatively in engagement with said contact pins in the lower of said discs, a third pair of oppositely disposed contactors disposed under said lower disc and aligned with said first-named members, and said third pair of contactors formed substantially like the first-named contactor being alternatively registrable with each of said contact pins in said lower disc.

LAWRENCE E. THOMPSON.

REFERENCES CITED

The following references are of record in the file of this patent:

UNITED STATES PATENTS

| Number | Name | Date |
| --- | --- | --- |
| 390,904 | Ries | Oct. 9, 1888 |
| 1,663,779 | Soreng | Mar. 27, 1928 |
| 1,906,463 | Hamm | May 2, 1933 |